United States Patent [19]

Scheeren et al.

[11] Patent Number: 5,033,249

[45] Date of Patent: Jul. 23, 1991

[54] INSULATING GLAZING

[75] Inventors: Peter Scheeren, Monschau; Hans-Dieter Peetz, Aachen, both of Fed. Rep. of Germany

[73] Assignee: Saint-Gobain Vitrage, Courbevoie, France

[21] Appl. No.: 323,844

[22] Filed: Mar. 15, 1989

[30] Foreign Application Priority Data

Mar. 19, 1988 [DE] Fed. Rep. of Germany ....... 3809301

[51] Int. Cl.[5] .......................... E06B 3/00; E06B 3/64
[52] U.S. Cl. .......................................... 52/790; 49/501; 296/96.14; 296/146; 52/479; 52/788; 156/107
[58] Field of Search ......................... 52/790, 788, 479; 49/501; 296/96.14, 146; 156/99, 107

[56] References Cited

U.S. PATENT DOCUMENTS

| 1,927,033 | 9/1933 | Herron | 296/96.14 |
| 3,940,898 | 3/1976 | Kaufman | 52/790 X |
| 4,151,682 | 5/1979 | Schmidt | 49/501 X |
| 4,186,685 | 2/1980 | Chenel et al. | 118/410 |
| 4,205,104 | 5/1980 | Chenel | 428/34 |
| 4,226,063 | 10/1980 | Chenel | 52/172 |
| 4,335,166 | 6/1982 | Lizardo | 156/99 X |
| 4,357,187 | 11/1982 | Stanley | 52/788 X |
| 4,428,156 | 1/1984 | Malm | 49/501 |
| 4,479,989 | 10/1984 | Dawson | 156/99 X |
| 4,637,167 | 1/1987 | Svensson | 49/501 X |
| 4,850,168 | 7/1989 | Thorn | 49/501 X |
| 4,875,308 | 10/1989 | Peetz | 52/790 X |

FOREIGN PATENT DOCUMENTS

| 303330 | 2/1989 | European Pat. Off. | 52/788 |
| 1197603 | 7/1965 | Fed. Rep. of Germany . | |
| 2555384 | 6/1976 | Fed. Rep. of Germany . | |
| 3044179 | 6/1982 | Fed. Rep. of Germany | 156/90 |
| 3402323 | 8/1985 | Fed. Rep. of Germany | 52/479 |
| 2166035 | 8/1973 | France | 156/107 |
| 2095737 | 10/1982 | United Kingdom | 52/788 |
| 2109851 | 6/1983 | United Kingdom | 52/788 |

Primary Examiner—David A. Scherbel
Assistant Examiner—Deborah McGann Ripley
Attorney, Agent, or Firm—Oblon, Spivak, McClelland, Maier & Neustadt

[57] ABSTRACT

Disclosed is an insulating glazing which includes two glass sheets spatially separated by an interposed air layer and assembled by a set of two plastic seals, the inside seal being extruded in the form of a bead and the peripheral seal filling all or part of the groove delimited by the glass sheets and the bead which includes on its face in contact with the peripheral seal a protuberance and/or a groove for mutual anchoring of the two seals.

7 Claims, 2 Drawing Sheets

INSULATING GLAZING

BACKGROUND OF THE INVENTION

1. Field of the Invention

The invention relates to an insulating glazing and process for obtaining it, consisting of two glass sheets spatially separated by an interposed air layer and assembled close to their edges by a set of two seals made of different plastics. The invention applies particularly to making insulating glazings for motor vehicles or any other support often subjected to vibrations.

2. Discussion of the Background

The best known insulating glazings comprise two glass sheets spatially separated by a rigid brace frame often formed by hollow metal sections filled with a desiccant to absorb the moisture from the interposed air layer. This brace frame and the two glass sheets delimit an outside peripheral groove in which is injected a plastic forming a seal, for example, of the polysulfide type.

From the patents DE -2 555 383 and DE-2 555 384 insulating glazings are also know in which the rigid brace frame is replaced by a plastic bead, for example of the butyl rubber type constituting a first seal. This inside seal acts as a spacer at least until the glazing is completely finished, i.e., until the outside peripheral seal has completely polymerized. Therefore, it should be perfectly calibrated and for this reason is produced by an extruder. In this case, the dessicant is contained directly in the extruded plastic forming the bead.

The flexibility of the bead at the time of its extrusion is particularly well suited for the production of insulating glazings in a particular shape such as bent glazings for motor vehicles. Further, automobile insulating glazings require thin interposed air layers which are best suited for this type of double glazing.

However, it has been found that when an insulating glazing is installed under particularly difficult conditions and repeatedly undergoes vibrations, shocks or rapid pressure variations in the interposed air layer, in the long run a separation of the inside bead and outside peripheral seal occurs, along the upper edge of the glazing. Such conditions are exceptional for a building glazing but, on the other hand, are the rule when the glazing is mounted in a traveling motor vehicle. Considerable pressure variations are observed particularly when the vehicle is traveling in a mountainous area. The separation observed is due to less adhesiveness of the inside bead to the glass. When the bead begins to become slightly detached from the glass on the upper edge of the glazing, it holds only by being suspended from the outside peripheral seal. Strong stresses can weaken the bond between the outside seal and inside bead, so that the bead has a tendency to sag. Even if the seal of the insulating glazing is not affected, this phenomenon is particularly annoying to the extent that the bead in principle masked by the window frame then becomes visible, resulting in the presumption of complete wearing out of the glazing.

SUMMARY OF THE INVENTION

The invention has as its object providing an insulating glazing without a rigid metal brace frame and whose seals do not separate even when the glazing is subjected to multiple stresses such as those experienced in a traveling motor vehicle.

The insulating glazing according to the invention consists of two glass sheets spatially separated by an interposed air layer defining a space and assembled by a set of two plastic seals, the inside seal being extruded in the form of a bead and the peripheral seal filling all or part of the groove delimited by the glass sheets and the bead. According to the invention and in order to obtain a mutual anchoring of the two seals, the bead comprises on its face in contact with the peripheral seal a protuberance and/or a groove extending toward one of the glass sheets.

The peripheral seal, whose consistency at the time of its injection into the peripheral groove varies according to the products used from a freshly liquid state to a more viscous state close to that of molasses, fills the groove or surrounds the protuberances of the bead. The adhesiveness of the peripheral seal to the glass is very great and is not deteriorated by repeated stresses due to vibration or expansion-retraction of the interposed air layer because of an imbalance of the gas pressures. Thus, good anchoring of the bead is obtained which remains in place even when it no longer adheres perfectly to the glass and is not supported as is the case on the upper edge of the glazing.

Such an insulating glazing can be used particularly in locations continuously or repeatedly subjected to considerable vibrations or other stresses, particularly in motor vehicles, trains or the like, or possibly in the glazings of buildings.

To obtain such an insulating glazing, it is possible to use an extruder whose nozzle has an extrusion head opposite the direction of movement of the nozzle placed vertically with respect to the glass sheet and moved parallel to the edges of the latter. The extrusion head comprises a recess which gives exactly the desired shape to the section of the bead which thus exhibits an anchoring projection. The peripheral seal is injected all around the glazing after deposit of the second glass sheet.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
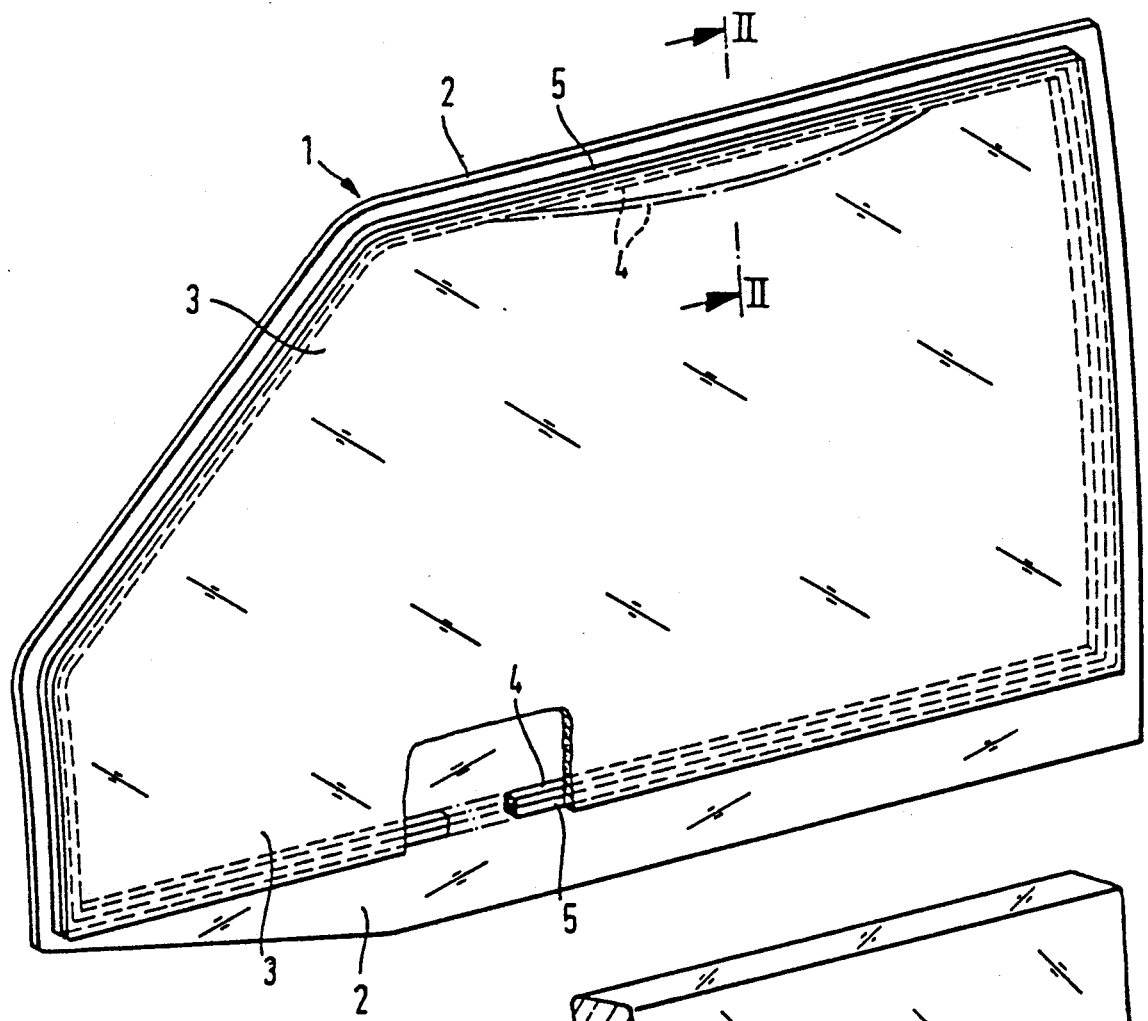
FIG. 1 shows a bent double insulating glazing for a motor vehicle according to the prior art.

FIG. 1 shows an overall view of a conventional bent square for a side door of an automobile with an insulating glazing 1. For a better penetration coefficient of the vehicle in the air, a flush mounting allowing good continuity between the body and glazing is provided. For this purpose, insulating glazing 1 consists of two glass sheets 2, 3 of different dimensions, only the greater (glass sheet 2) of the sheets being held by the frame associated with the body.

A bead 4 with a butyl rubber base acts as a spacing frame in the space 30 between sheets 2 and 3. This bead is obtained by extrusion and simultaneous deposit on one of the bent sheets. The butyl rubber contains an adequate amount of a dessicant to absorb the moisture from the interposed air layer and to avoid the phenomena of condensation and, consequently, of fogging. After application of butyl rubber bead 4, the second glass sheet is placed on the frame thus made and then is pressed lightly for a good seal. Thus, a peripheral groove is defined which is then filled by injection of second seal 5, for example of polysulfide of the THIOKOL type.

Inside bead 4 is extruded in a standard way by a nozzle with relative movement in relation to the glass and defining a bead with a rectangular or slightly rounded section. Because of the need for good calibration of this bead (to obtain the desired thickness of the air layer), a material with great viscosity such as butyl rubber and/or with a polyisobutylene base should be used for this purpose. In return for the desired stability of shape, such a plastic exhibits less adhesiveness with regard to the glass. Without consequence for an insulating glazing placed under standard conditions of a building glazing, this less adhesiveness results in, when the glazing is subjected particularly to vibrations, a detachment of the bead adhering to the glass. In the long run, bead 4 is held only by peripheral seal 5 so that along the upper edge of the glazing (this being where gravity contributes to sagging of the bead), the beginning of separation of bead 4 and peripheral seal 5 can be observed as soon as the bonding forces which unite them are compensated for by the forces tending to the sagging of the bead.

Figure 2:
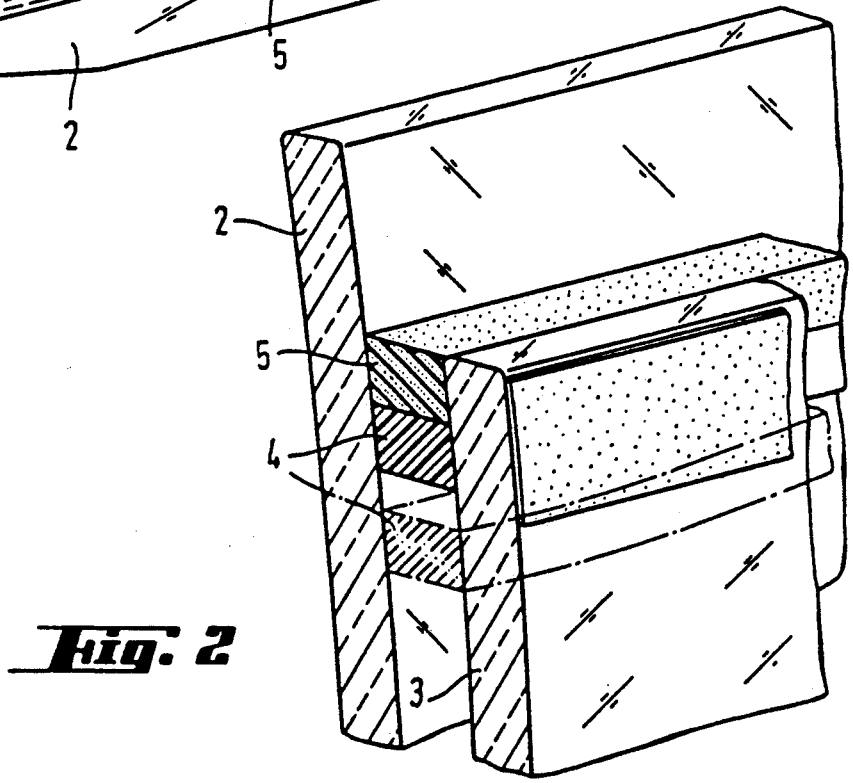
FIG. 2 is a view in section taken along line II—II of FIG. 1.

With peripheral seal 5 remaining correctly positioned, the seal of the glazing is not thereby affected. However, bead 4, initially masked by the frame and/or a layer of enamel as shown in FIGS. 1 and 2, then becomes visible and opens as shown in broken lines, with a certain unaesthetic effect.

Figure 3:
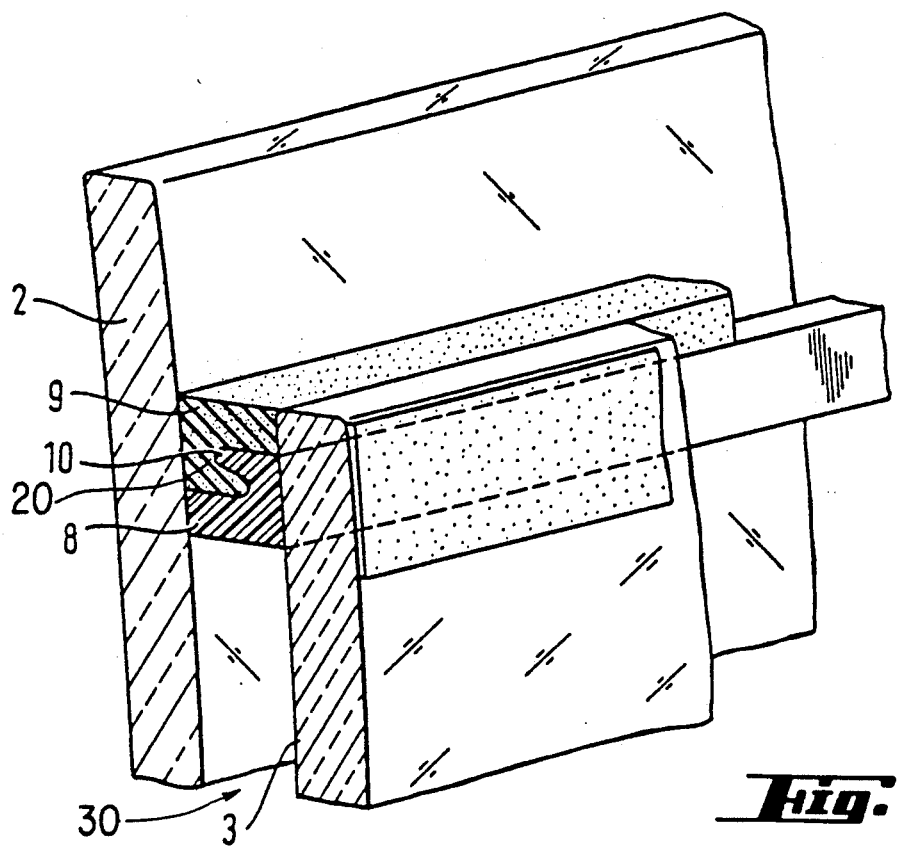
FIG. 3 is a view similar to FIG. 1 for an insulating glazing according to the present invention.

This technical problem is solved by an insulating glazing which is the object of this invention and is represented in FIG. 3. Here inside bead 8 has its outside, in contact with peripheral seal 9, shaped so that undercuts are formed behind seal 9. Any configuration of bead 8 leading to the formation of a projection 10, in which the peripheral seal can be anchored mechanically, can be suitable. Thus a groove 20 corresponds to a projection for an assembly of the mortise and tenon type, each of which extend toward one of the glass of sheets 2, 3.

Figure 4:
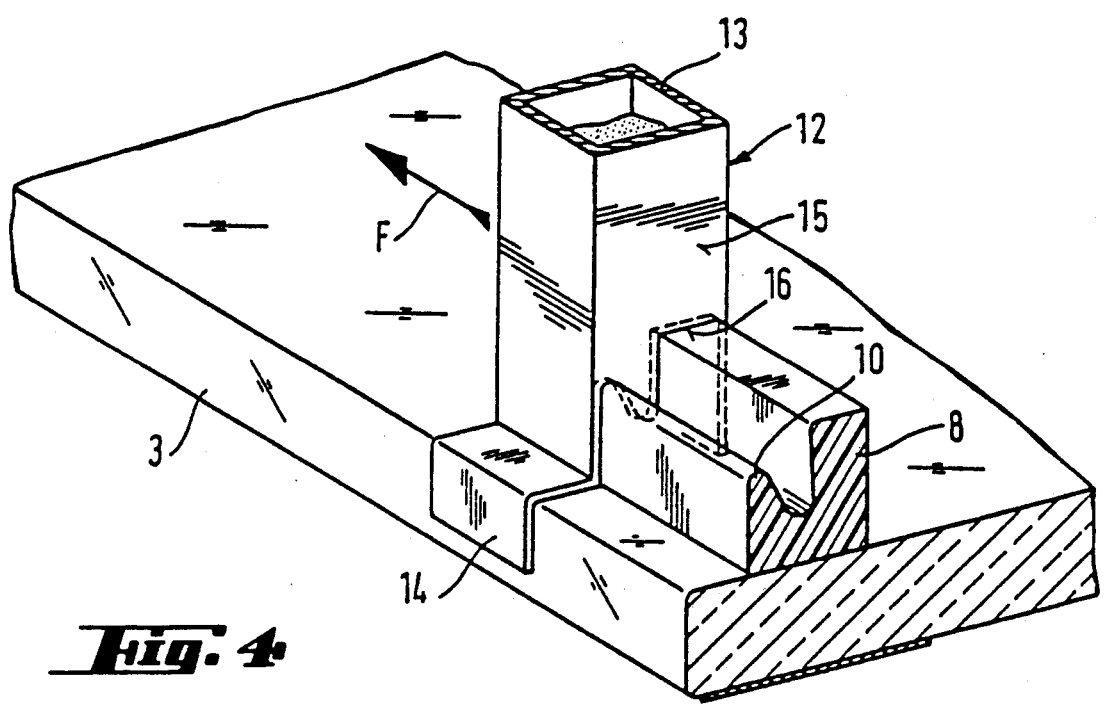
FIG. 4 is a diagram illustrating the extrusion of a bead with an anchoring projection.

An extrusion procedure as diagrammed in FIG. 4 is used, for example, to obtain a shaped bead. Extruder 12 comprises a parallelepipedic feed vertical duct 13 resting by one of its ends on glass sheet 3 and kept correctly positioned relative to the edges of the latter by a guide 14. Face 15 of duct 13, opposite the direction of movement of the nozzle relative to the glass (diagrammed by arrow F), comprises a recess 16 which corresponds exactly to the section of bead 8 which it is desired to extrude. Thus, when the extruder is correctly fed with butyl rubber with the necessary pressure, by moving the nozzle in the direction of arrow F, a perfectly calibrated bead 8 is deposited here with an anchoring projection 10.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Insulating glazing, which comprises:
   two glass sheets spatially separated by an interposed air layer;
   a seal which consists of two overlapping plastic seals each adhering to said two glass sheets, respectively, and which include an inside seal in the form of a bead and a peripheral seal for filling at least part of a space defined by said two glass sheets, wherein said inside seal comprises, on a face thereof in contact with said peripheral seal, a protuberance extending toward an inside face of one of said glass sheets and a groove for mutual anchoring of said inside seal and said peripheral seal.

2. Insulating glazing according to claim 1, wherein said inside seal comprises butyl rubber containing a dessicant and said peripheral seal comprises polysulfide.

3. Insulating glazing according to claim 2, wherein said two glass sheets each have a thickness of between 2 and 3 mm and wherein an interposed air sheet has a thickness of between 2 and 5 mm.

4. Insulating glazing according to claim 1, wherein said two glass sheets each having a thickness of between 2 and 3 mm and wherein said interposed air sheet has a thickness of between 2 and 5 mm.

5. Insulating glazing according to claim 1, wherein said two glass sheets each comprise bent glass sheets.

6. Insulating glazing, which comprises:
   two glass sheets spatially separated by an interposed air layer;
   a seal which consists of a set of two overlapping plastic seals which include an inside seal in the form of a bead and a peripheral seal for filling at least part of a space defined by said two glass sheets, wherein said inside seal comprises, on a face thereof in contact with said peripheral seal, a groove extending toward an inside face of one of said glass sheets for mutually anchoring said inside seal and said peripheral seal.

7. Insulating glazing, which comprises:
   two glass sheets spatially separated by an interposed air layer;
   a seal which consists of a set of two overlapping plastic seals which include an inside seal in the form of a bead and a peripheral seal for filling at least part of a space defined by said two glass sheets, wherein said inside seal comprises, on a face thereof in contact with said peripheral seal, a protuberance extending toward an inside face of one of said glass sheets for mutually anchoring said inside seal and said peripheral seal.

* * * * *